June 1, 1954  F. J. BRUMME  2,679,972
MOTOR-DRIVEN BLOWER MOUNTED ON PIPE
Filed June 16, 1949  2 Sheets-Sheet 1
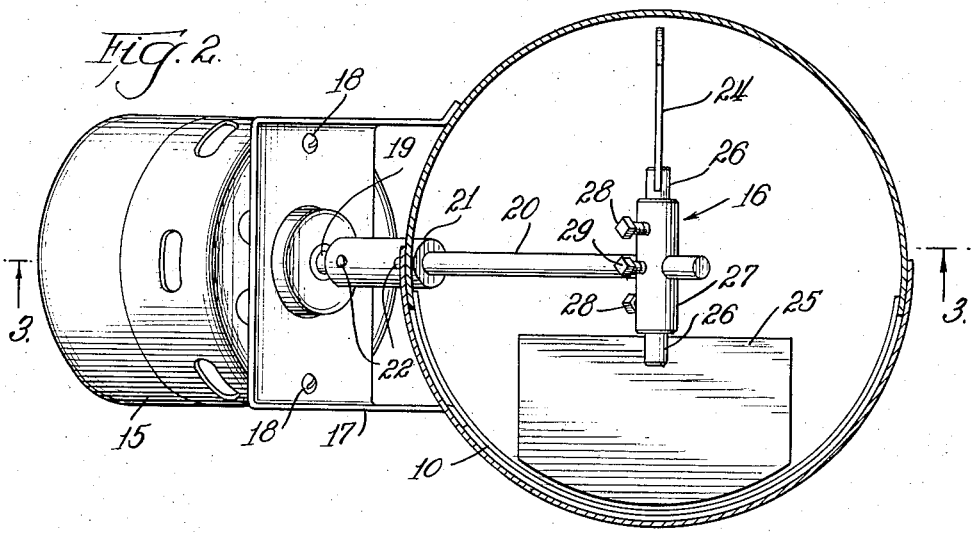
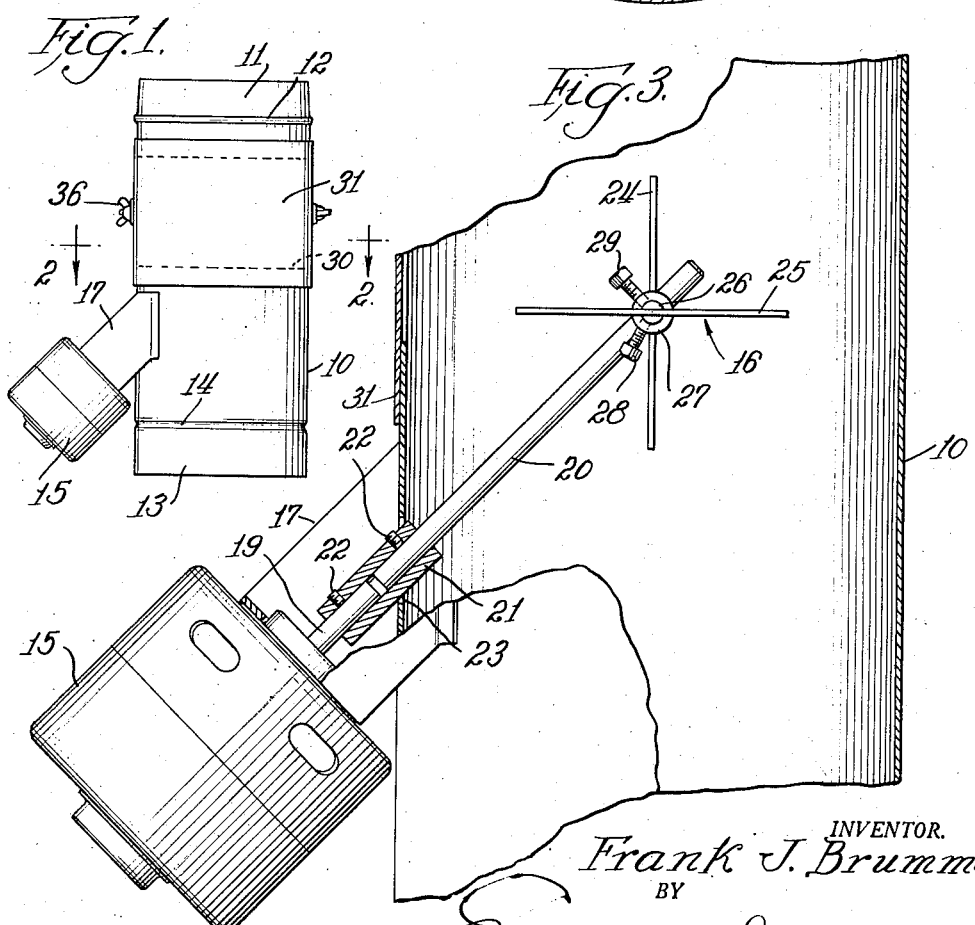
INVENTOR.
Frank J. Brumme
BY
Eugene M. Giles  att'y.

June 1, 1954
F. J. BRUMME
2,679,972
MOTOR-DRIVEN BLOWER MOUNTED ON PIPE
Filed June 16, 1949
2 Sheets-Sheet 2
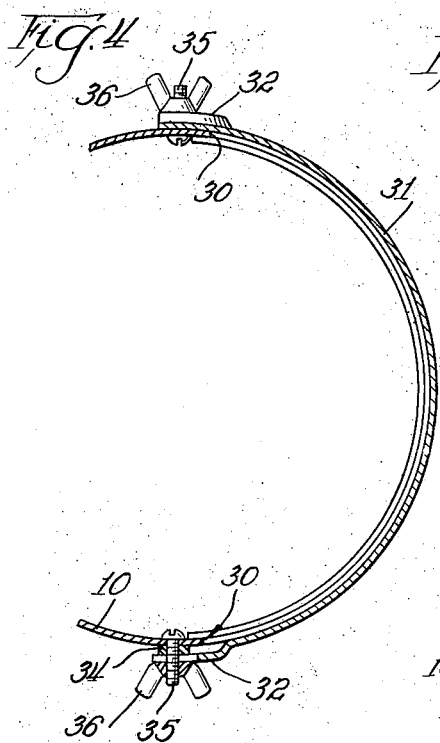
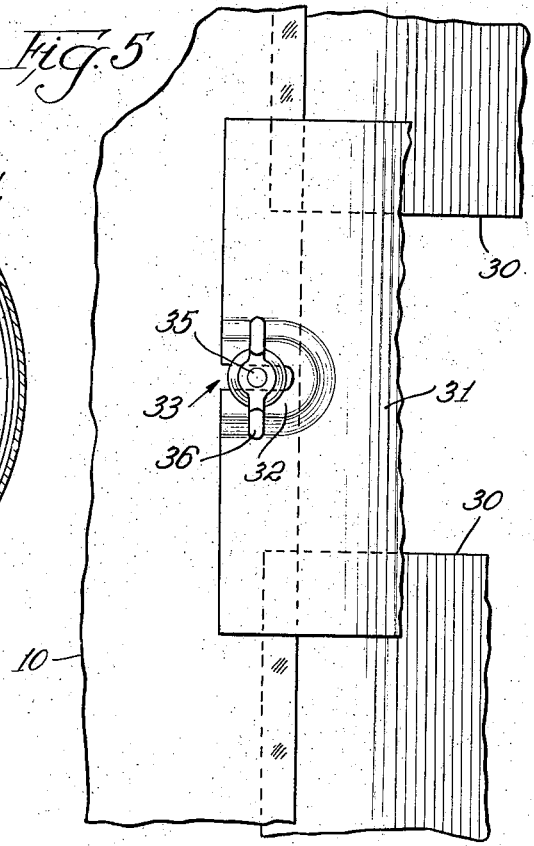
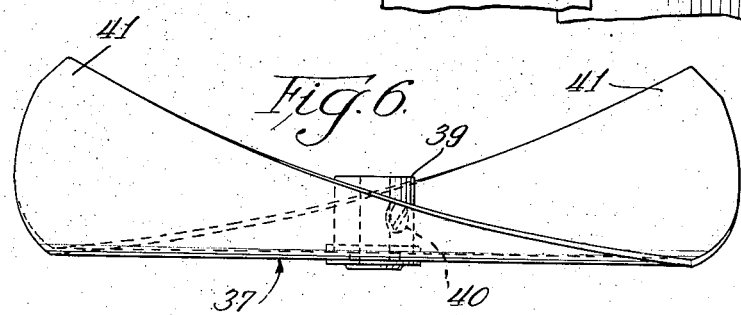
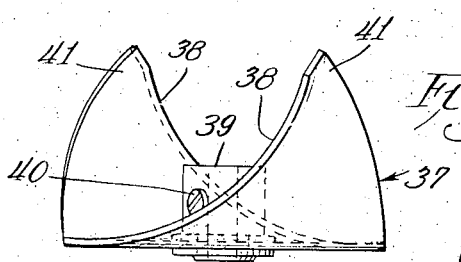
INVENTOR.
Frank J. Brumme
BY
Eugene M Giles atty Patented June 1, 1954

2,679,972

UNITED STATES PATENT OFFICE 2,679,972

MOTOR-DRIVEN BLOWER MOUNTED ON PIPE

Frank J. Brumme, Bloomington, Ill.

Application June 16, 1949, Serial No. 99,527

2 Claims. (Cl. 230—117)

My invention relates to a pipe with a fan therein for enforcing circulation through the pipe and has reference more particularly to a construction wherein a straight length of pipe has a propeller type fan therein directly connected to an operating motor which is outside the pipe.

Oftentimes when hot air or gases are conducted through pipe it is desirable to provide a fan therein to increase circulation, for example, in the exhaust pipe from a heater or furnace, when the natural draft is insufficient.

It is important, however, to locate the motor outside the flue so as to avoid exposure thereof to heat and soot which would be likely to damage the motor or interfere with the operation thereof. Moreover, it is desirable for simplicity of construction and efficiency of operation to provide a direct connection of the fan with the motor shaft and to avoid location of bearings within the flue where they are not readily accessible and are exposed to the heat and soot therein.

Generally, it is necessary or desirable to install such draft increasing fans in a straight length of the pipe, and no simple and satisfactory construction has been available heretofore by which a propeller type of fan is applicable to such straight lengths of pipe.

It is an object of my invention to provide an improved construction of draft-increasing fan in a straight length of pipe. It is another object of my invention to locate the motor for such draft-increasing fan at the exterior of the pipe. It is a further object of my invention to permit direct connection of a propeller type fan within the pipe to a motor at the exterior thereof. It is a still further object of my invention to avoid locating any bearings in the pipe where they would be exposed to heat and soot. And, in general, it is the object of my invention to provide a simple inexpensive, and efficient straight pipe structure with a draft increasing propeller fan therein, these and other objects being accomplished as hereinafter described, reference being had to the accompanying drawing in which:

Fig. 1 is a side view of a length of pipe showing my draft-increasing fan installed therein;

Fig. 2 is an enlarged view on the line 2—2 of Fig. 1;

Fig. 3 is a view looking at the bottom of the structure of Fig. 2, but showing the pipe and motor supporting bracket mostly in section on the line 3—3 of Fig. 2.

Fig. 4 is a fragmentary transverse sectional view showing a detail of the pipe construction;

Fig. 5 is a view of a fragmentary portion of the pipe wall;

Fig. 6 is a side view of an optional type of propeller fan; and

Fig. 7 is an end view of the propeller fan shown in Fig. 6.

While my invention is applicable to any type of flue or duct in which it is desired to increase the draft or enforce circulation therethrough, it is particularly advantageous for use in connection with sheet metal pipe of the character commonly employed for conducting products of combustion from a furnace, stove, or the like to the chimney or stack.

Accordingly, I have shown and described my invention herein as applied to a length of stove pipe 10 of conventional form made of sheet metal and having one end thereof slightly reduced in diameter as at 11, beyond an annular external bead 12, the other end 13 of said pipe length being of normal size beyond an annual internal bead 14 to receive therein an end 11 of another similar pipe to make up whatever length of smoke pipe is required in the particular case.

The beads 12 and 14 not only serve as stops to limit the interengagement of the pipe lengths but are designed to reinforce the pipe and maintain the circularity thereof, such reinforcement being particularly desirable in the present case to insure ample rigidity to support the parts mounted on the pipe.

An electric motor 15 of any suitable type is provided to operate the draft-increasing fan 16 and is mounted at an angle with respect to the pipe 10 by means of a U-shaped bracket 17 which may be made of sheet metal and is secured to the pipe 10 in any convenient manner, for example by welding, and in an angular position thereon as shown in Fig. 3. The motor 15 is secured to the bracket 17 by means of bolts 18 and the motor shaft 19 extends therethrough at a preferred angle of about 45 degrees with respect to the longitudinal axis of the pipe 10.

The draft-increasing fan 16 is mounted on an extension shaft 20 which is connected to the motor shaft 19 by means of a coupling 21 which is secured to the shafts 19 and 20 by means of set screws 22. The extension shaft 20 and the coupling 21 project into the pipe 10 through the opening 23 in the sidewall of the pipe, the said opening 23 being of the size necessary to permit free turning of the coupling 21 therein without contact.

The draft-increasing fan 16 may be of any propeller fan type which will produce circulation in the desired direction when mounted on a shaft projecting obliquely into a cylindrical enclosure. A preferred type of draft-increasing fan is shown in Figs. 2 and 3 wherein the opposed blades 24 and 25 are flat plates disposed at right angles with respect to each other. Each blade 24 and 25 has a stem 26 engaged in its respective end of the sleeve 27 and retained in predetermined position with respect thereto by means of the set screw 28. The said sleeve 27 is mounted on the extension shaft 20 by means of the screw 29.

In the rotation of the fan 16, the blades 24 and 25 move in one half side of the pipe 10 in a direction corresponding to that of the smoke flow through the pipe, for example upwardly in the pipe 10 of Fig. 3, and in the opposite side half of the pipe said blades 24 and 25 move in the reverse direction, or downwardly in the pipe of Fig. 3, and said blades are arranged so that each thereof when midway in its movement in the direction of smoke flow is in a plane substantially at right angles to the longitudinal axis of the pipe 10 in the position in which the blade 25 is shown in Fig. 3, whereas each blade when midway in its movement in said reverse direction is in a plane substantially coinciding or parallel with the longitudinal axis of the pipe in the position in which the blade 24 is shown in Fig. 3. Thus, on the rising portion of its stroke as viewed in Fig. 3, each blade is moving mostly sidewise toward the upper end of the pipe and accordingly imparts substantial thrust of smoke in the direction of smoke circulation through the pipe whereas in the descending portion of its stroke, each blade is moving mostly edgewise toward the lower end of the pipe and accordingly has practically no propelling effect on the smoke in that direction.

For the purpose of gaining access to the draft-increasing fan 16, an opening 30 may be provided in one wall of the pipe 10 opposite the location of the fan 16, as shown in Figs. 1, 4 and 5. A removable door 31 comprising a curved section of sheet metal, serves to close the opening 30. At each end thereof in the direction of its curvature, the door 31 has a raised portion 32 with a slot 33 leading inwardly from the marginal edge of the door 31. The raised portion 32 is adapted to fit over the nut 34 which retains the bolt 35 in place. The said bolt 35 is straddled by the slot 33 in the edge of the door 31 when the said door is mounted over the opening 30 in the pipe 10 and the door is held firmly in position by engagement of the raised portions 32 between the nuts 34 and the wing nuts 36. Thus the door 31 may be removed and reinstalled quite conveniently when it is desired to inspect or adjust the draft-increasing fan 16.

Referring now to Figs. 6 and 7, I have shown another type of draft-increasing fan 37 which has been used effectively in connection with my invention. This fan 37 comprises a substantially rectangular section of sheet metal with portions curved upwardly, as shown particularly at 38 in Fig. 7 at opposite sides of a diagonal line thereof. This fan 37 is provided with a hub 39 secured thereto at the center in any convenient manner. The hub 39 has a bore of suitable size to fit on the extension shaft 20 and is secured in place thereon by a set screw 40, with the turned up corners 41 extending in the direction in which the air is to be circulated.

Such fans and similar fans which are of the type to produce circulation generally in the direction lengthwise of the axis of rotation thereof, are referred to herein as propeller fans.

While I have shown and described my invention in a preferred form, I am aware that various modifications can be made therein without departing from the spirit of my invention, the scope of which is to be determined by the appended claims.

What I claim:

1. An air duct and fan assembly comprising a substantially straight length of pipe, a motor, a motor support which projects from the side of the pipe in a direction oblique to the longitudinal axis of the pipe and is interposed between the motor and pipe and has the motor secured endwise thereto at the outer end thereof and has the inner end secured directly to the side wall of the pipe, a shaft which is rotated by the motor and supported solely thereby and projects axially therefrom through said support and obliquely into the pipe through the side wall thereof beyond the inner end of said motor support and is spaced apart from and free of contact with said support and pipe, and a fan within the pipe and secured on the shaft to rotate therewith, said support being formed with a space therein between the motor and pipe through which the shaft extends and through which air is circulatable from the exterior of the support.

2. An air duct and fan assembly comprising a substantially straight length of pipe, a motor, a shaft which is rotated by the motor and supported solely thereby and projects axially therefrom obliquely into the pipe through the side wall thereof, a fan within the pipe and secured on the shaft to rotate therewith, and a U-shaped motor support which is interposed between the motor and pipe and projects obliquely from the pipe and has the motor secured endwise thereto at the outer end thereof, said support having a pair of widely spaced legs which are joined together at their outer ends and straddle the shaft and have their inner free ends secured to the side wall of the pipe at widely separated places at opposite sides of the shaft.

References Cited in the file of this patent

UNITED STATES PATENTS

| Number | Name | Date |
|---|---|---|
| 300,384 | Mathieu | June 17, 1884 |
| 1,082,594 | Kern | Dec. 30, 1913 |
| 1,182,863 | Toussaint | May 9, 1916 |
| 1,314,563 | Axen | Sept. 2, 1919 |
| 1,399,617 | Hahn | Dec. 6, 1921 |
| 1,498,789 | Drouillard | June 24, 1924 |
| 1,502,862 | Menk | July 29, 1924 |
| 1,573,973 | Lamontagne | Feb. 23, 1926 |
| 2,179,893 | Lyon | Nov. 14, 1939 |
| 2,276,614 | Grapp | Mar. 17, 1942 |
| 2,282,256 | Smelik | May 5, 1942 |

FOREIGN PATENTS

| Number | Country | Date |
|---|---|---|
| 53,550 | Netherlands | Dec. 15, 1952 |
| 470,305 | Germany | Jan. 9, 1929 |
| 473,579 | Germany | Mar. 16, 1929 |
| 504,020 | Germany | July 30, 1930 |